United States Patent
Arnett et al.

(10) Patent No.: US 12,469,044 B1
(45) Date of Patent: Nov. 11, 2025

(54) DIGITAL PROMOTION PROCESSING SYSTEM INCLUDING CONTESTED EVENT OUTCOME DIGITAL PROMOTION AND RELATED METHODS

(71) Applicant: Inmar Clearing, Inc., Winston-Salem, NC (US)

(72) Inventors: Laura Arnett, Aldie, VA (US); Andreas M. Benamou, Spicewood, TX (US); Jacob Bowman, Greensboro, NC (US); Srinivasan Varadarajan, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/614,668

(22) Filed: Mar. 23, 2024

(51) Int. Cl.
*G06Q 30/00* (2023.01)
*G06Q 30/0207* (2023.01)
*G06Q 30/0226* (2023.01)
*G06Q 30/0235* (2023.01)

(52) U.S. Cl.
CPC ..... *G06Q 30/0235* (2013.01); *G06Q 30/0224* (2013.01); *G06Q 30/0226* (2013.01)

(58) Field of Classification Search
None
See application file for complete search history.

(56) References Cited

U.S. PATENT DOCUMENTS

| 10,354,286 | B1 | 7/2019 | Walker | |
|---|---|---|---|---|
| 10,445,774 | B2 | 10/2019 | Reese et al. | |
| 2005/0144031 | A1* | 6/2005 | Blach | G06Q 30/02 705/35 |
| 2006/0224451 | A1* | 10/2006 | Kerschbrock | G06Q 30/0235 705/14.27 |
| 2013/0080239 | A1* | 3/2013 | Okerlund | G06Q 20/387 705/14.27 |

(Continued)

FOREIGN PATENT DOCUMENTS

| WO | WO-2015123284 A1 * | 8/2015 | ......... G06Q 30/0252 |
|---|---|---|---|
| WO | WO-2021179019 A1 * | 9/2021 | ............. G01S 19/14 |
| WO | WO-2023225166 A1 * | 11/2023 | ......... H04N 21/2187 |

OTHER PUBLICATIONS

Raanan, Jordan. "Sixers win 'huge' game, give fans free Big Macs", https://www.nj.com/sixers/2012/12/sixers_win_huge_game_give_fans.html. Dec. 22, 2012. (Year: 2012).*

*Primary Examiner* — Michael Bekerman
(74) *Attorney, Agent, or Firm* — ALLEN, DYER, DOPPELT, + GILCHRIST, P.A.

(57) ABSTRACT

A digital promotion processing system may include shopper devices each associated with a given shopper. The digital promotion processing system may also include a digital promotion processing server configured to cooperate with each of the shopper devices to operate a retailer loyalty application on corresponding ones of the shopper devices. The digital promotion processing server may also be configured to obtain an outcome of a contested event, determine a geographic location associated with the contested event, (Continued)

and determine ones of the shoppers within a threshold distance from the geographic location based upon respective geographic locations of the shopper devices. The digital promotion processing server may also be configured to generate and communicate a digital promotion to the ones of the shoppers and accessible via the retailer loyalty application based upon the outcome of the contested event matching a desired event outcome.

21 Claims, 9 Drawing Sheets

(56) References Cited

U.S. PATENT DOCUMENTS

| | | | | |
|---|---|---|---|---|
| 2013/0185159 | A1* | 7/2013 | Crane | G06Q 30/0269 |
| | | | | 705/14.66 |
| 2014/0129306 | A1* | 5/2014 | Rappoport | G06Q 30/0212 |
| | | | | 705/14.14 |
| 2014/0379454 | A1* | 12/2014 | Geyen | G06Q 30/0235 |
| | | | | 705/14.35 |
| 2015/0235268 | A1* | 8/2015 | Bell | G06Q 30/0252 |
| | | | | 705/14.5 |
| 2017/0091798 | A1* | 3/2017 | Burnett | G06Q 30/0209 |
| 2022/0277352 | A1* | 9/2022 | Lancaster | H04N 21/4722 |
| 2023/0241479 | A1* | 8/2023 | Hill | G06Q 20/387 |
| | | | | 700/91 |
| 2024/0330991 | A1* | 10/2024 | Mayster | G06Q 30/0639 |

* cited by examiner

FIG. 9

DIGITAL PROMOTION PROCESSING SYSTEM INCLUDING CONTESTED EVENT OUTCOME DIGITAL PROMOTION AND RELATED METHODS

TECHNICAL FIELD

The present invention relates to the field of electronics, and, more particularly, to the processing of digital promotions and related methods.

BACKGROUND

A loyalty program is a marketing strategy that encourages shoppers to continue to purchase items or services from one or more retailers, for example. A loyalty program typically involves the retailer or other entity that operates or manages the loyalty program to set up an account for a user. Rewards are added or associated with the loyalty account, for example, based upon purchases made at the retailer. Rewards may be redeemed by the shopper at a retailer, for example.

Watching a game or contested event may be a popular form of entertainment. A sporting team, for example, may have a significant number of fans within its hometown area. Many fans that do not attend the game in-person may go to a restaurant or bar to watch the game, while others may watch the game at home. Many fans that watch the game at home may prepare for watching the game by purchasing food and beverages, or other products for use or consumption during the game.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A digital promotion processing system may include a plurality of shopper devices, each associated with a given shopper. The digital promotion processing system may also include a digital promotion processing server configured to cooperate with each of the plurality of shopper devices to operate a retailer loyalty application on corresponding ones of the plurality of shopper devices. The digital promotion processing server may also be configured to obtain an outcome of a contested event, determine a geographic location associated with the contested event, and determine ones of the plurality of shoppers within a threshold distance from the geographic location based upon respective geographic locations of the plurality of shopper devices. The digital promotion processing server may also be configured to generate and communicate a digital promotion to the ones of the plurality of shoppers and accessible via the retailer loyalty application based upon the outcome of the contested event matching a desired event outcome.

The contested event outcome includes a game score of a team associated with the geographic location of the contested event. The desired event outcome may be the team having a winning game score, for example.

The digital promotion processing server may be configured to obtain historical purchase data associated with each of the plurality of shoppers. The digital promotion processing server may also be configured to determine the ones of the plurality of shoppers within the threshold distance from the geographic location based upon the historical purchase data, for example.

The digital promotion processing server may be configured to obtain historical purchase data for the shoppers determined to be within the threshold distance from the geographic location. The digital promotion processing server may also be configured to determine the desired contested event outcome based upon the historical purchase data, for example.

The contested event may have a contested event time period associated therewith, for example. The digital promotion processing server may be configured to obtain purchase data during the contested event time period and determine the desired contested event outcome based upon the purchase data during the event time period.

The contested event may have an event time period associated therewith, for example. The digital promotion processing server may be configured to obtain purchase data during the contested event time period and determine the threshold distance based upon the purchase data during the contested event time period, for example.

The digital promotion processing server may be configured to determine purchase data for geographic locations adjacent the geographic location associated with the contested event. The digital promotion processing server may also be configured to determine the threshold distance based upon the purchase data for the adjacent geographic locations.

The digital promotion processing server may be configured to communicate with a remote scoring server to obtain the contested event outcome. The digital promotion processing server may be configured to make an application programming interface (API) function call to the remote scoring server to obtain the contested event outcome, for example. The digital promotion processing server may be configured to cooperate with a given shopper device of the plurality thereof to, via the retailer loyalty application, save the digital promotion to a digital wallet associated with the corresponding shopper, for example.

A method of processing a digital promotion may include using a digital promotion processing server to cooperate with each of a plurality of shopper devices, each associated with a given shopper, to operate a retailer loyalty application on corresponding ones of the plurality of shopper devices. The method may also include using the digital promotion processing server to obtain an outcome of a contested event, determine a geographic location associated with the contested event, and determine ones of the plurality of shoppers within a threshold distance from the geographic location based upon respective geographic locations of the plurality of shopper devices. The method may also include using the digital promotion processing server to generate and communicate a digital promotion to the ones of the plurality of shoppers and accessible via the retailer loyalty application based upon the outcome of the contested event matching a desired event outcome.

A non-transitory computer readable medium for processing a digital promotion includes computer executable instructions that when executed by a processor cause the processor to perform operations. The operations may include cooperating with each of a plurality of shopper devices, each associated with a given shopper, to operate a retailer loyalty application on corresponding ones of the plurality of shopper devices, and obtaining an outcome of a contested event. The operations may also include determining a geographic location associated with the contested event and determining ones of the plurality of shoppers within a threshold distance from the geographic location based upon respective geographic locations of the plurality of shopper devices. The operations may also include generating and communicating a digital promotion to the ones of the plurality of shoppers and accessible via the retailer loyalty application based upon the outcome of the contested event matching a desired event outcome.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Referring initially to FIGS. 1-4, a digital promotion processing system 20 includes shopper devices 30a-30n. Each of the shopper devices 30a-30n is associated with a given shopper. A given shopper device 30a is illustratively in the form of a mobile wireless communications device, and, more particularly, a smartphone. The shopper devices 30a-30n may be in the form of another type of device, for example, a laptop computer, a desktop computer, a tablet computer, or a wearable computer. Each shopper device 30a-30n includes wireless communications circuitry 32 carried by a device housing 31. A controller 35 is coupled to the wireless communications circuitry 32 and cooperates therewith to perform at least one wireless communications function.

Figure 1:
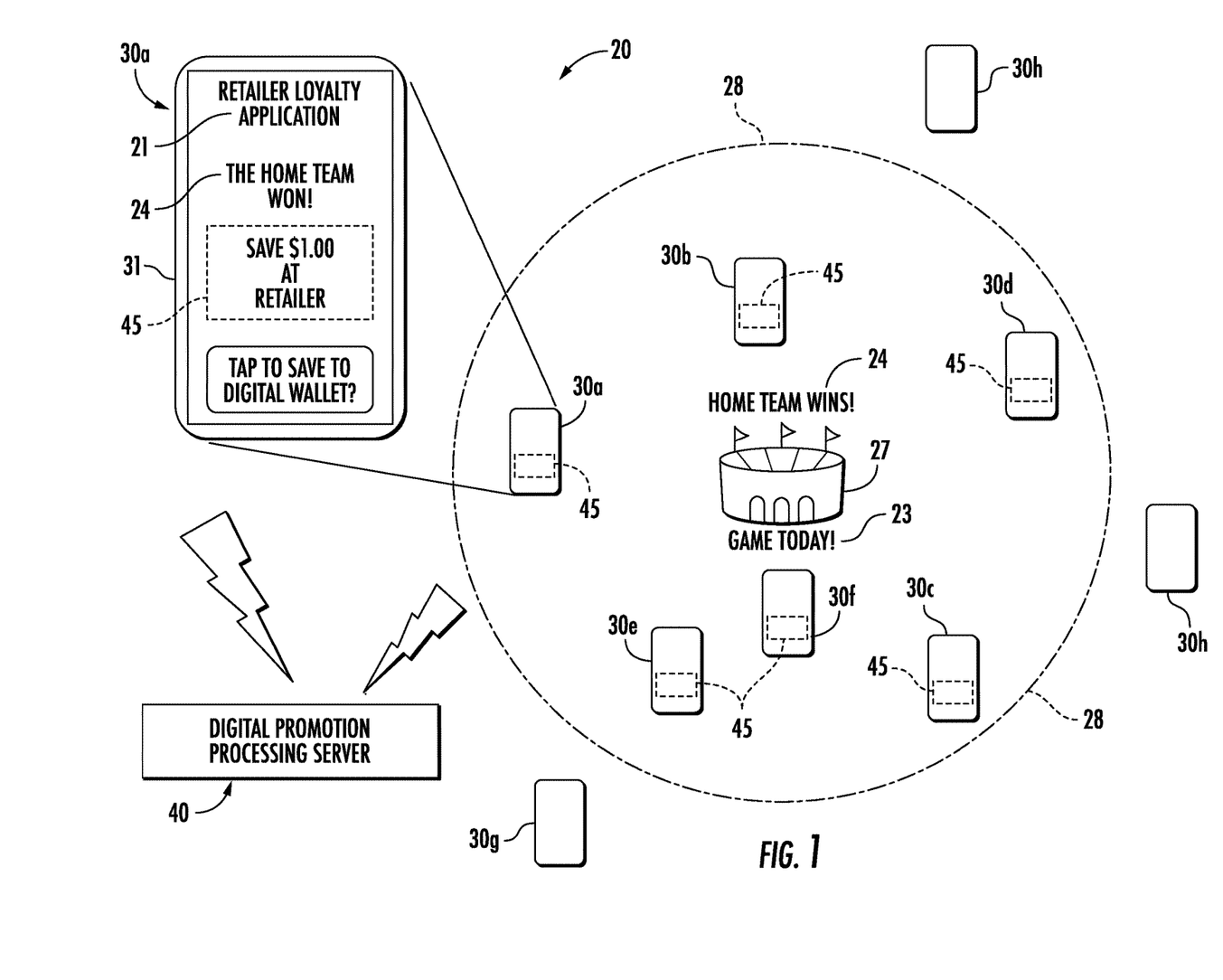
FIG. 1 is a schematic diagram of a digital promotion processing system in accordance with an embodiment.
Figure 2:
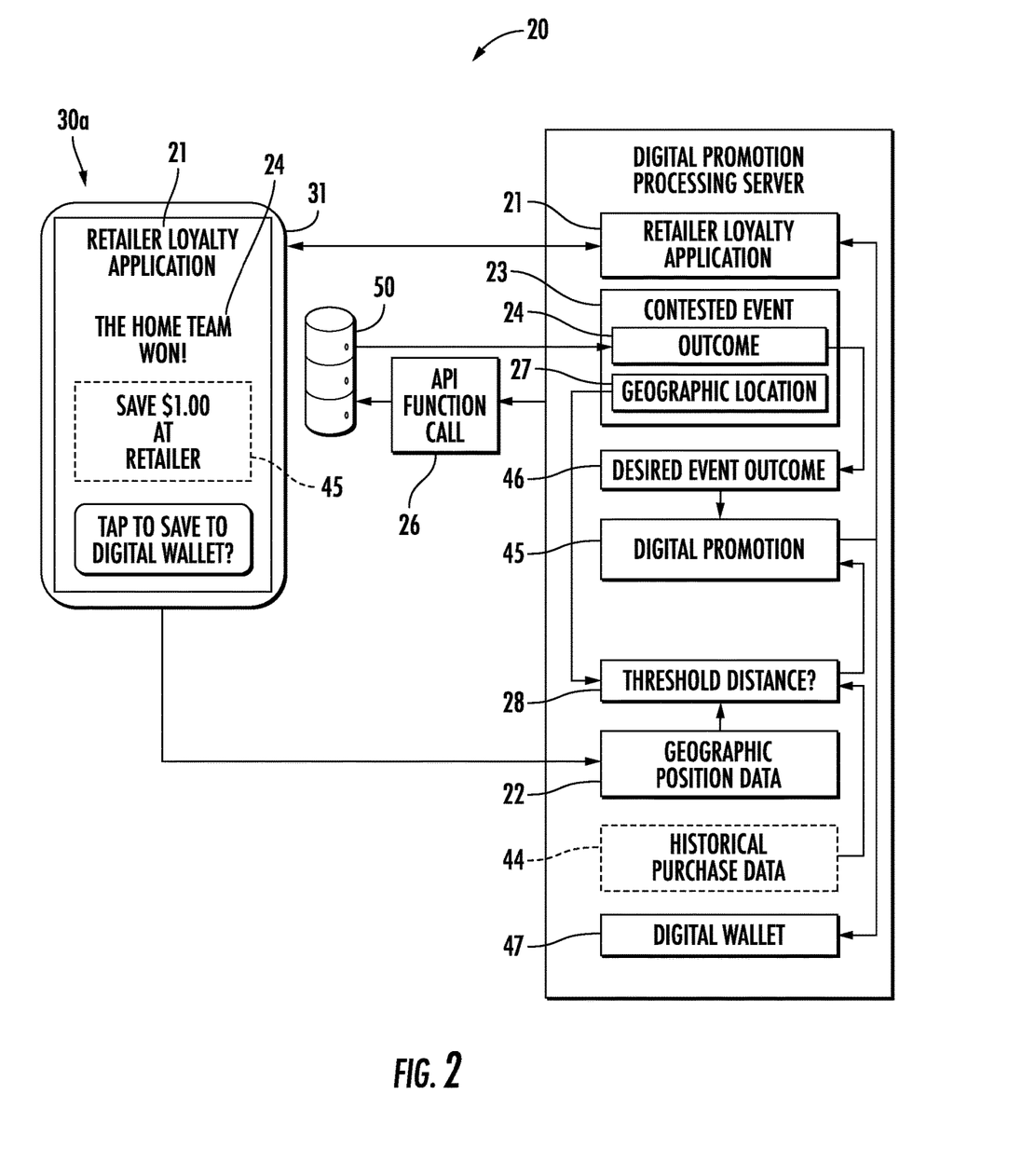
FIG. 2 is a schematic block diagram of the digital promotion processing system of FIG. 1.
Figure 3:
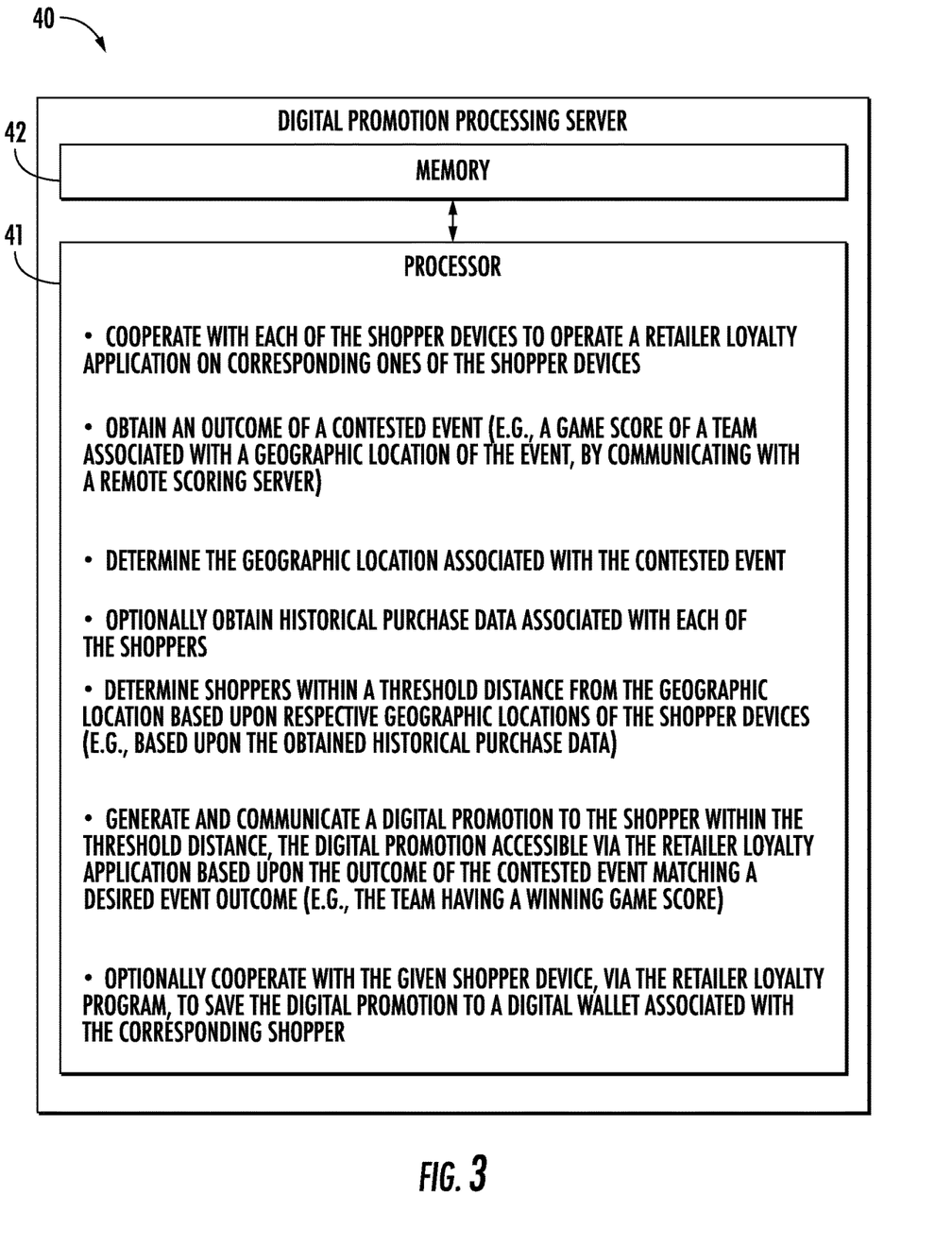
FIG. 3 is a schematic block diagram of the digital promotion processing server of FIG. 2.

The digital promotion processing system 20 also includes a digital promotion processing server 40. The digital promotion processing server 40 includes a processor 41 and an associated memory 42. While operations of the digital promotion processing server 40 are described herein, the processor 41 and the memory 42 cooperate to perform the operations.

Figure 5:
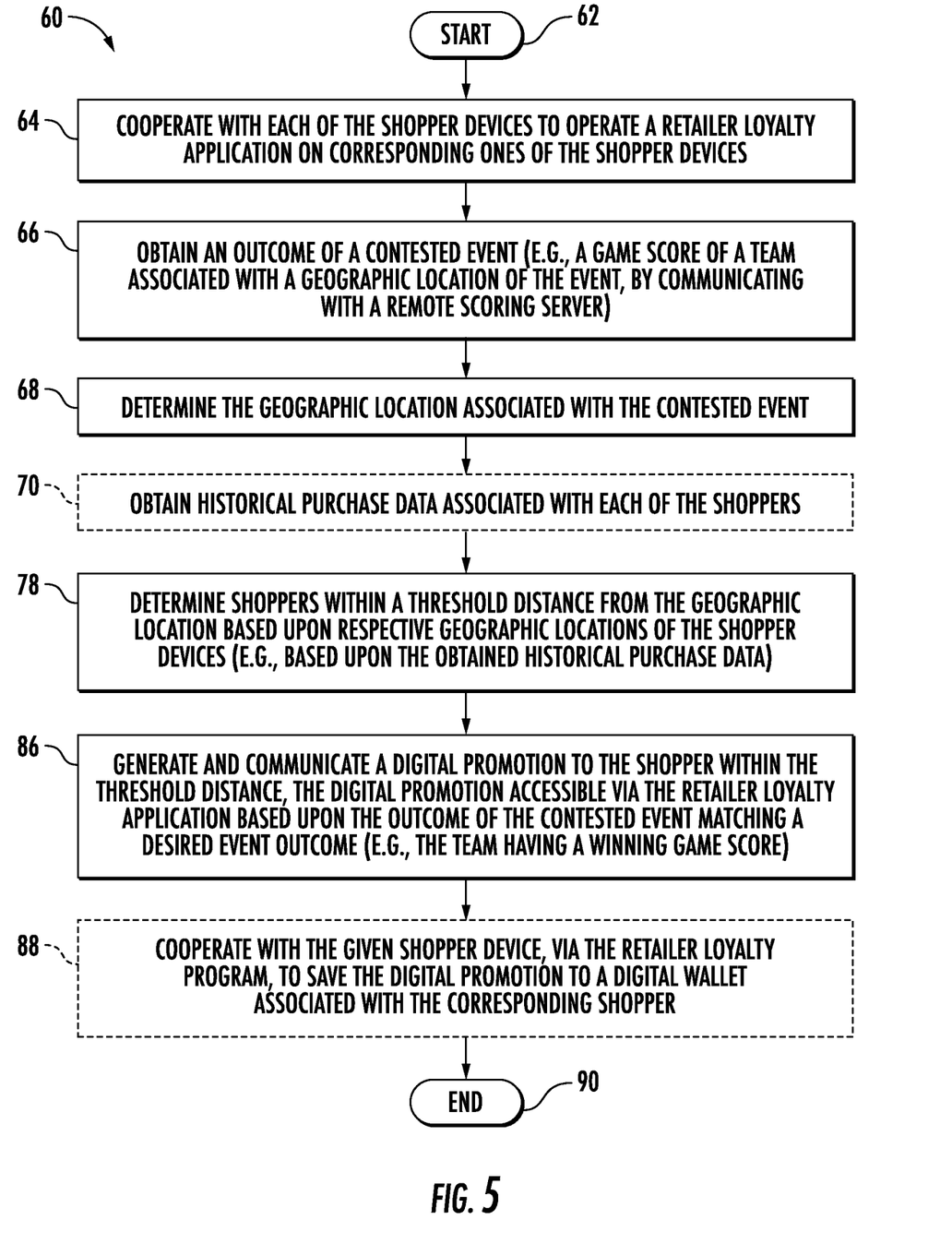
FIG. 5 is a flow diagram illustrating operation of the digital promotion processing server of FIG. 2.

Referring now additionally to the flowchart 60 in FIG. 5, beginning at Block 62, operations of the digital promotion processing server 40 will now be described. At Block 64, the digital promotion processing server 40 cooperates with each of the shopper devices 30a-30n to operate a retailer loyalty application 21 on corresponding shopper devices.

Figure 4:
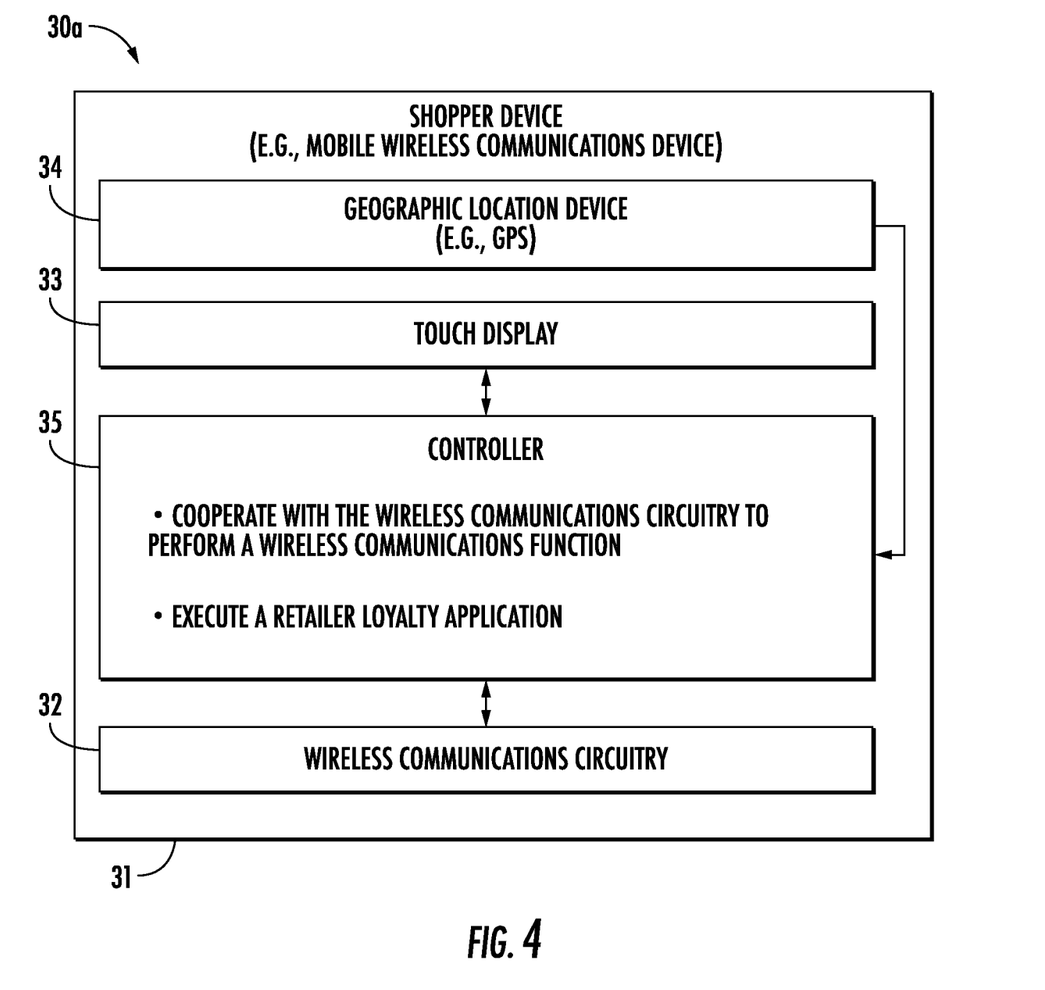
FIG. 4 is a schematic block diagram of the shopper device of FIG. 2.

More particularly, the retailer loyalty application 21, for example, associated with a retailer, may be executed on the shopper devices 30a-30n (e.g., by the controller 35). As will be appreciated by those skilled in the art, the retailer loyalty application 21, while executed on the shopper devices 30a-30n, communicates, for example, wirelessly, with the digital promotion server 40 to perform loyalty program operations. A display 33, for example, a touch display, may be carried by the housing 31 and coupled to the controller 35. Input to the retailer loyalty application 21 may be accepted by one or more input devices, such as, for example, the touch-display 33. The loyalty program operations may include adding items to a shopping list, finding and selecting a desired or favorite store or location, looking up a product purchase price, storing historical purchase data, and/or permitting online or in-application purchases.

Of course, the loyalty program application 21 may perform other and/or additional functions, such as, for example, communicating geographic location information associated with the shopper devices 30a-30n to the digital promotion processing server 40. For example, the shopper devices 30a-30n may each include a geographic location device 34 (e.g., a global position system (GPS) receiver) that obtains geographic position data 22. The shopper devices 30a-30n may communicate so that the digital promotion processing server 40 obtains the geographic position data 22 from the shopper devices. The geographic position data 22 may be in the form of geographic (e.g., GPS) coordinates.

The digital promotion processing server 40 obtains an outcome 24 of a contested event 23 (Block 66). The contested event outcome 24 may be a game score of a team associated with the geographic location of the contested event 23, for example, a "home team" to a city or geographic area. The digital promotion processing server 40 may obtain the contested event outcome 24 by communicating with a remote server 50. For example, where the event outcome 24 is a game score, the remote server 50 would be a game score server or database for past and current game scores. The digital promotion server 40 may, to obtain the event outcome 24, may make an application programming interface (API) function call 26 to the remote server 50. For example, an exemplary API function call 26 may include, as input, a team, date, and time, while the function may return the outcome 24 of the contested event 23.

The digital promotion processing server 40 determines a geographic location 27 associated with the contested event 23 (Block 68). For example, when the contested event 23 is a game score of a team, the team may be associated with a geographic location 27, such as, for example, a city, state, region, or country. The digital promotion processing server 40 may communicate with one or more remote computers, for example, via the Internet, to obtain keywords indicative of the associated geographic location 27. For example, the digital promotion processing server 40 may search the Internet for the contested event (e.g., team name, title of the contested event 23) to retrieve the associated geographic location 27. Where, for example, the contested event 23 is a sporting event (i.e., game score), the team name may be submitted in a search, and the search may be returned with the geographic location 27.

The digital promotion processing server 40 may determine the associated geographic location 27 based upon the location of the contested event. For example, when the contested event 23 is in the form of a casino gaming event and takes place at a casino in Las Vegas, Nevada, the digital promotion processing server 40 may determine the geographic location 27 to be Las Vegas, Nevada, and particularly, the casino at which the casino gaming event is taking place.

At Block 70, the digital promotion processing server 40 may optionally obtain historical purchase data 44 associated with the shoppers. More particularly, the digital promotion processing server 40 may access a shopper's loyalty account, e.g., via or associated with the retailer loyalty application 21, to determine the historical purchase data 44, for example, at the retailer. The historical purchase data 44 may include product identifiers, product purchase dates and times, product descriptions, product prices, order total price, and/or whether a digital promotion or digital coupon was applied to the order and/or specific products. Of course, the historical purchase data 44 may include other and/or additional information.

At Block 78, the digital promotion processing server 40 determines shoppers that are within a threshold distance 28 from the geographic location 27 of the contested event 23. The threshold distance 28 may be set by the digital promotion processing server 40 to be a radius around the geographic location 27 of the contested event 23 (e.g., within 10-miles of the contested event). The threshold distance 28 may be set by the digital promotion processing server 40 to be a city or state, for example, associated with a team (e.g., hometown) when the contested event 23 is associated a game involving the team. The digital promotion processing server 40 may set the threshold distance 28 based upon a population of people living or actively within a geographic area around the contested event 23, for example, to obtain a desired reach, as will be appreciated by those skilled in the art. More particularly, the digital promotion processing server 40 may set the threshold distance 28 to be larger when the population around the contested event 23 is smaller, while the threshold distance may be set to be smaller when the population around the contested event is larger (e.g., a major metropolitan area).

The digital promotion processing server 40 may determine the shoppers within the threshold distance 28 based upon respective geographic locations of the shopper devices 30a-30n. The digital promotion processing server 40 may communicate, for example, wirelessly, to obtain the geographic position data 22 from each shopper device. The geographic position data 22 may be obtained via the retailer loyalty application 21, for example. The geographic position data 22 may be indicative of the respective geographic positions of the shopper devices 30a-30n, for example, when the geographic position data is in the form of GPS location data. The digital promotion processing server 40 may compare the geographic position data 22 obtained from the shopper devices 30a-30n to geographic position data associated with the threshold distance (e.g., GPS coordinates within or outside the threshold area defined by the threshold distance) to determine whether the geographic position data is indicative of the shopper devices being within the threshold distance 28.

In embodiments where the digital promotion processing server 40 obtains historical purchase data 44 associated with the shoppers, the digital promotion processing server may determine the shoppers within the threshold distance 28 based also upon the obtained historical purchase data. More particularly, the digital promotion processing server 40 may determine that a given shopper, while not currently within the threshold distance 28, typically visits a retailer or store within the threshold distance. This may occur when a given shopper lives outside the threshold distance 28, but travels often within the threshold distance to purchase products at the retailer, e.g., associated with the retailer loyalty application 21. In this case, those shoppers may be determined to be within the threshold distance 28. A given shopper may be determined to be within the threshold distance 28 when the given shopper visits a retailer, as determined by the historical purchase data 44, more than a threshold number of times in a given period (e.g., more than twice a week). The threshold number of times may be different among shoppers, for example, and based upon a distance traveled, for example, from a home address as determined from the retailer loyalty account of the given shopper, to the retailer within the threshold distance 28.

The digital promotion processing server 40, at Block 86, generates and communicates a digital promotion 45 based upon the outcome 24 of the contested event 23 matching a desired event outcome 46. When, for example, the contested event outcome 24 is a game score of a team associated with the geographic location 27 associated with the contested event 23 (e.g., hometown team or home team), the desired event outcome 46 may be the team having a winning score. The digital promotion processing server 40 communicates the digital promotion 45 to the shoppers determined to be the threshold distance 28 from the geographic location 27 when the desired outcome 46 matches the outcome 24 of the contested event 23. The digital promotion 45 is communicated to the shoppers via the respective shopper devices 30a-30n, and, more particularly, so that it is accessible via the retailer loyalty application 21.

The digital promotion 45 is illustratively in the form of a digital coupon, and is redeemable at the retailer, for example, associated with the retailer loyalty application 21. In an exemplary implementation, the digital promotion processing server 40 may generate and communicate the digital promotion 45 to the respective shopper devices 30a-30n for shoppers within the threshold distance 28 via the retailer loyalty application 21 when the desired event outcome 46 matches the outcome 24. The digital promotion 45 may be available in the retailer loyalty application 21. The respective shopper may be unaware that the digital promotion 45 will be presented in the retailer loyalty application 21. However, should the given shopper open their retailer loyalty application 21, the shopper would see the digital promotion 45 or a notification of its existence. In some embodiments, the retailer may have or include signage in the physical store notifying shoppers of a digital promotion 45 within their respective retailer loyalty application 21. At Block 88, the digital promotion processing server 40 may cooperate with a given shopper device 30a-30n, for example, via the retailer loyalty application 21, to save the digital promotion to a digital wallet 47 associated with the corresponding shopper.

The digital promotion 45 may have an expiration date associated therewith, for example, based upon, for example, a frequency of the associated contested event 23. For example, for a weekly football game, the digital promotion 45 may be redeemable for 5 days. For example, for a game or event that occurs nearly every other day, the redemption period or expiration of the digital promotion 45 may be set to be 2-3 days. Operations end at Block 90.

Figure 6:
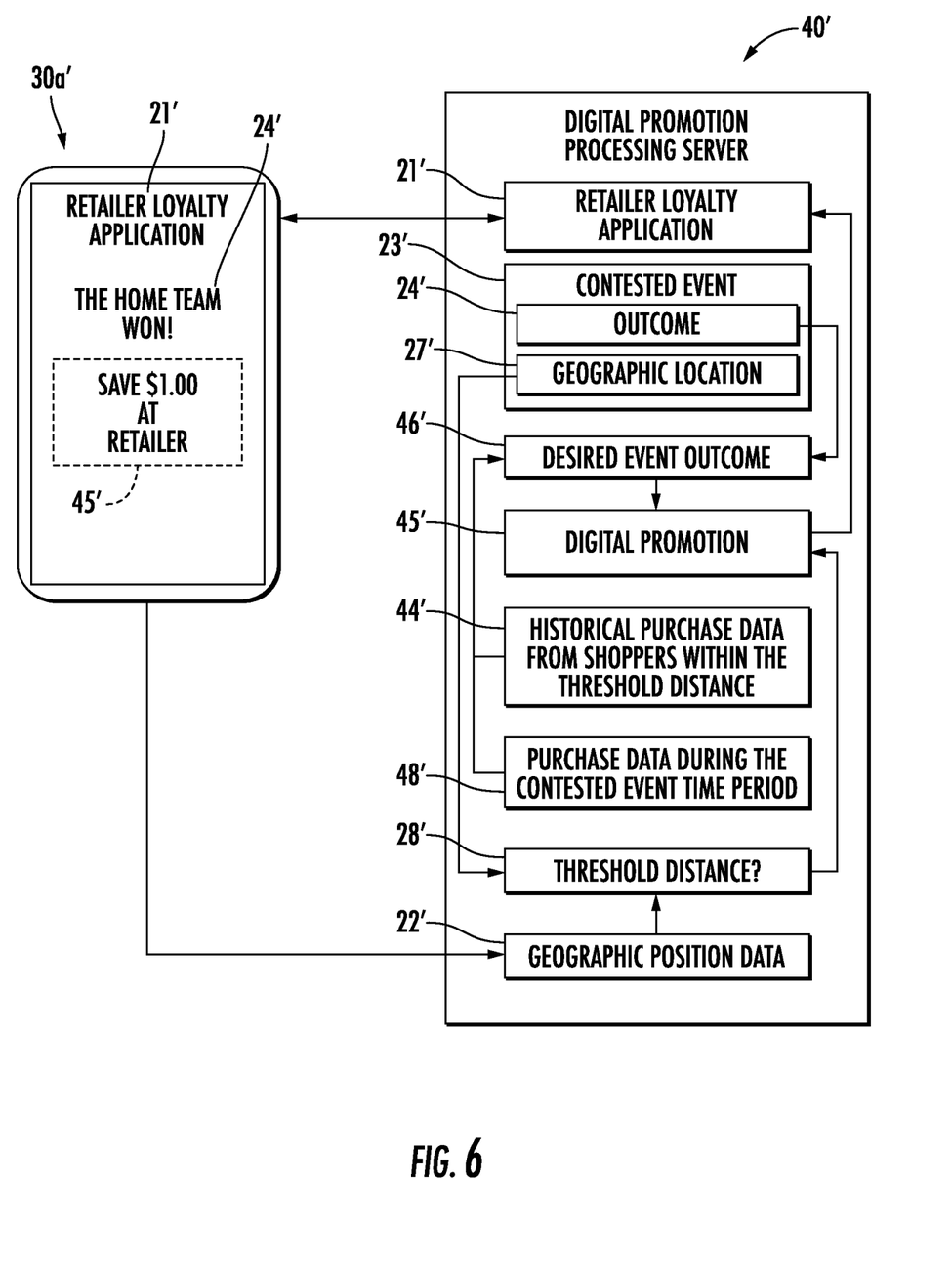
FIG. 6 is a schematic block diagram of a digital promotion processing system in accordance with another embodiment.
Figure 7:
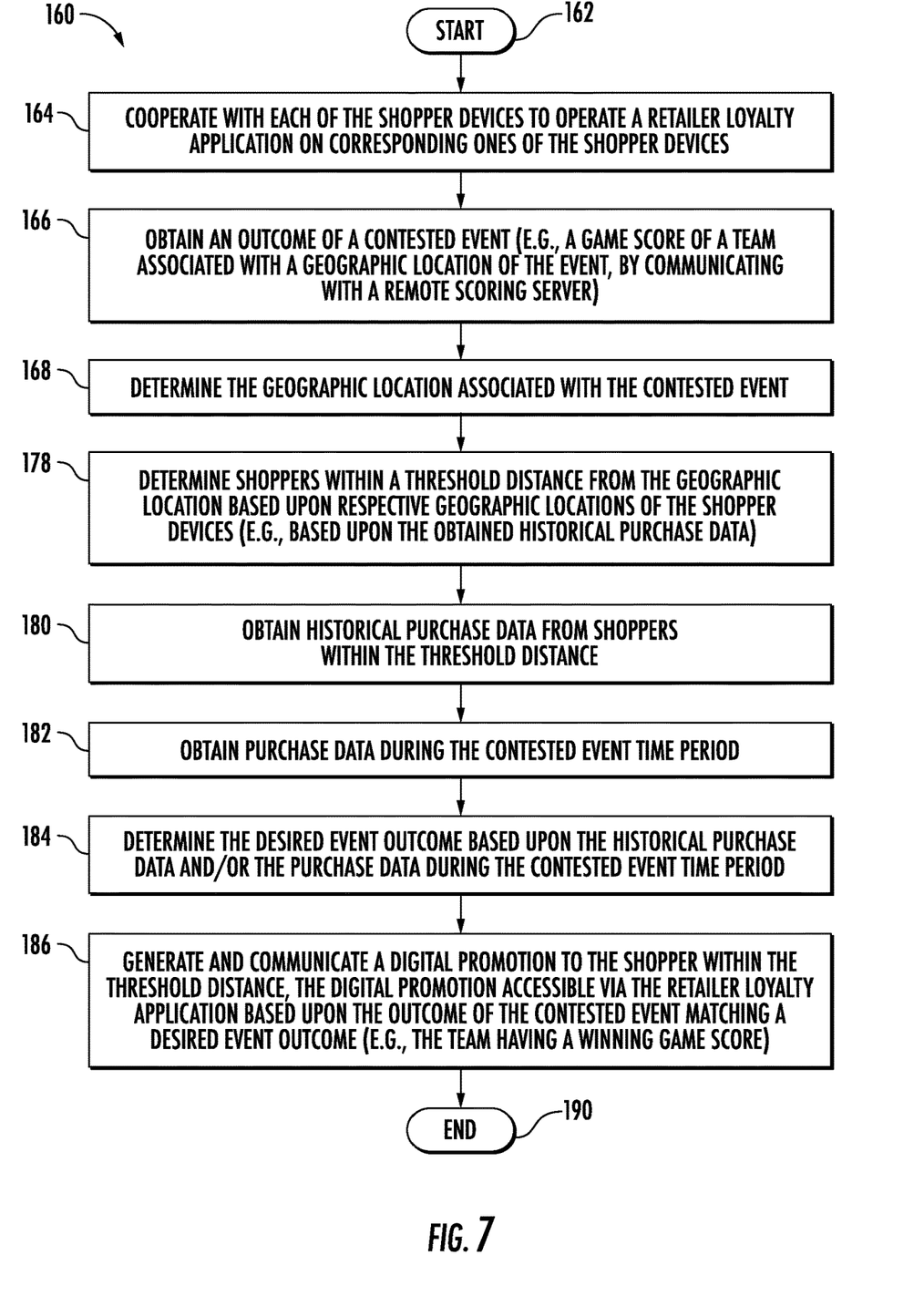
FIG. 7 is a flow diagram of operation of the digital promotion processing server of FIG. 6.

Referring now to FIG. 6 and the flowchart 160 in FIG. 7, beginning at Block 162, in another embodiment, at Block 180, the digital promotion processing server 40' obtains historical purchase data 44' from the shoppers determined to be within the threshold distance 28' from the geographic location 27'. The digital promotion processing server 40' may obtain the historical purchase data 44' as described above, by way of a loyalty account associated with each shopper and/or via the retailer loyalty application 21', for example.

At Block 182, the digital promotion processing server 40' may, alternatively or additionally, obtain purchase data (e.g., current purchase data) during a contested event time period 48' associated with the contested event 23'. More particularly, the digital promotion processing server 40' may obtain the purchase data 48' from 2-3 hours before the beginning of contested event 23' and 2-3 hours after the end of the contested event. In some embodiments, the contested event time period may correspond to the actual beginning and end of the contested event 23'.

The digital promotion processing server 40' determines the desired event outcome 46' based upon the historical purchase data 44' (Block 184). More particularly, the digital promotion processing server 40' may use the historical purchase data 44' to determine a relative increase in purchases or increased foot traffic at the retailers around time of previous contested events 23'. In embodiments where purchase data is obtained during the contested event time period (i.e. purchase data during the contested even time period 48'), the digital promotion processing server 40' may alternatively or additionally determine the desired event outcome 46' based upon the purchase data.

The digital promotion processing server 40' may change the desired event outcome 46'. For example, if a geographic location is typically associated with a team and thus a desired outcome, but for a given contested event on a given day, a large amount of fans from the non-home team attend the contested event or game (e.g., more than the home team), then the desired outcome may change to the non-home team winning. The digital promotion processing server 40' may determine that shoppers are associated with or are fans of the non-home team based upon historical purchase data from remote retailers (i.e., not within the threshold distance 28' from the geographic location 27'), the purchase data during the contested event time period (e.g., increased), and the corresponding shopper devices 30a' being within the threshold distance from the geographic location during the contested event time period. Operations illustrated, including operating the retailer loyalty application 21' on corresponding ones of the shopper devices 30a' (Block 164), obtaining an outcome 24' of the contested event 23' (Block 166), determining the geographic location 27' associated with the contested event (Block 168), determining shoppers within the threshold distance 28' (Block 178) and generating and communicating the digital promotion 45' based upon the outcome of the contested event matching a desired event outcome 46' (Block 186), are similar to those described above. Moreover, elements illustrated, for example, geographic position data 22 are also similar to those described above. Operations end at Block 190.

Figure 8:
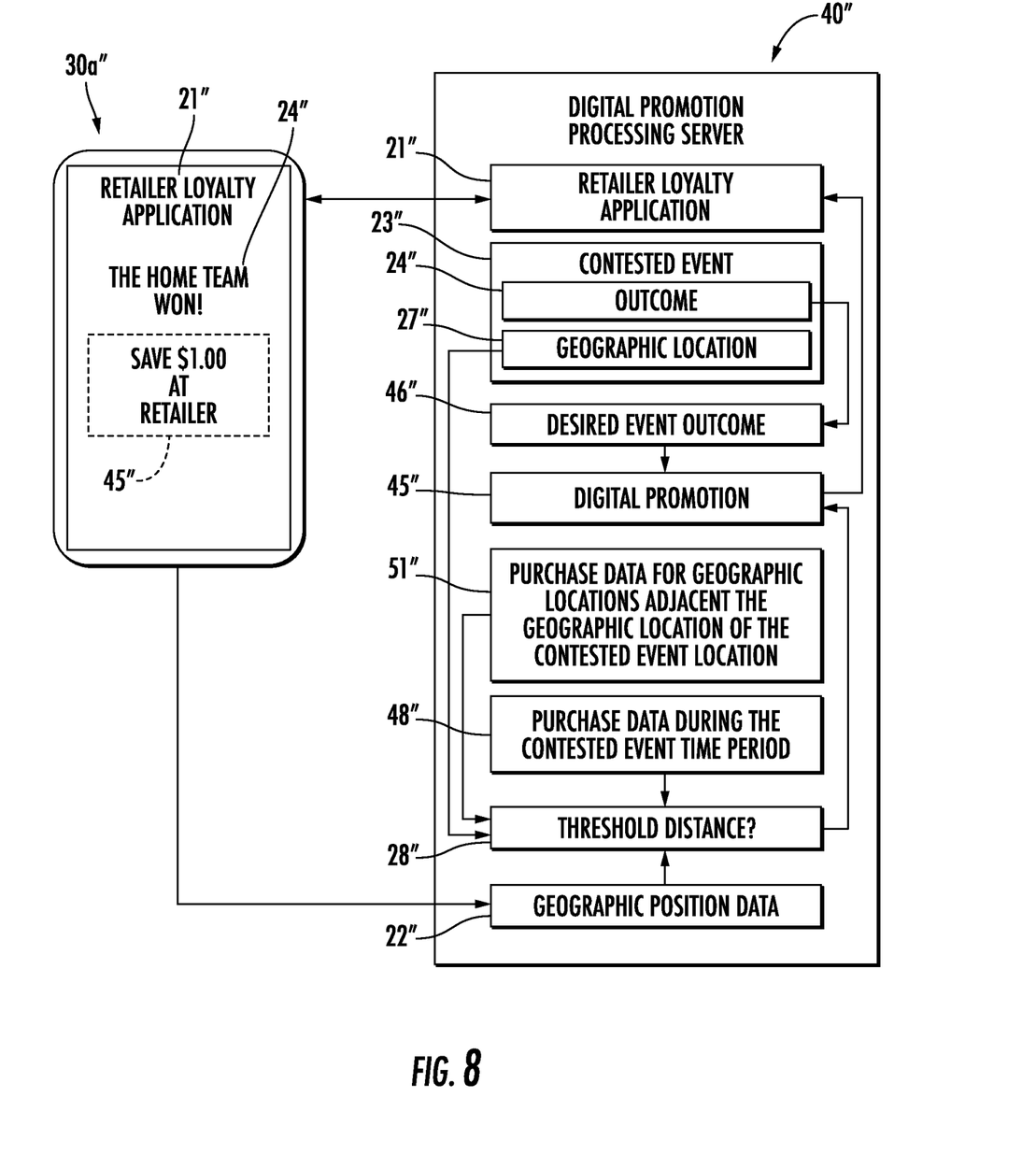
FIG. 8 is a schematic block diagram of a digital promotion processing system in accordance with another embodiment.
Figure 9:
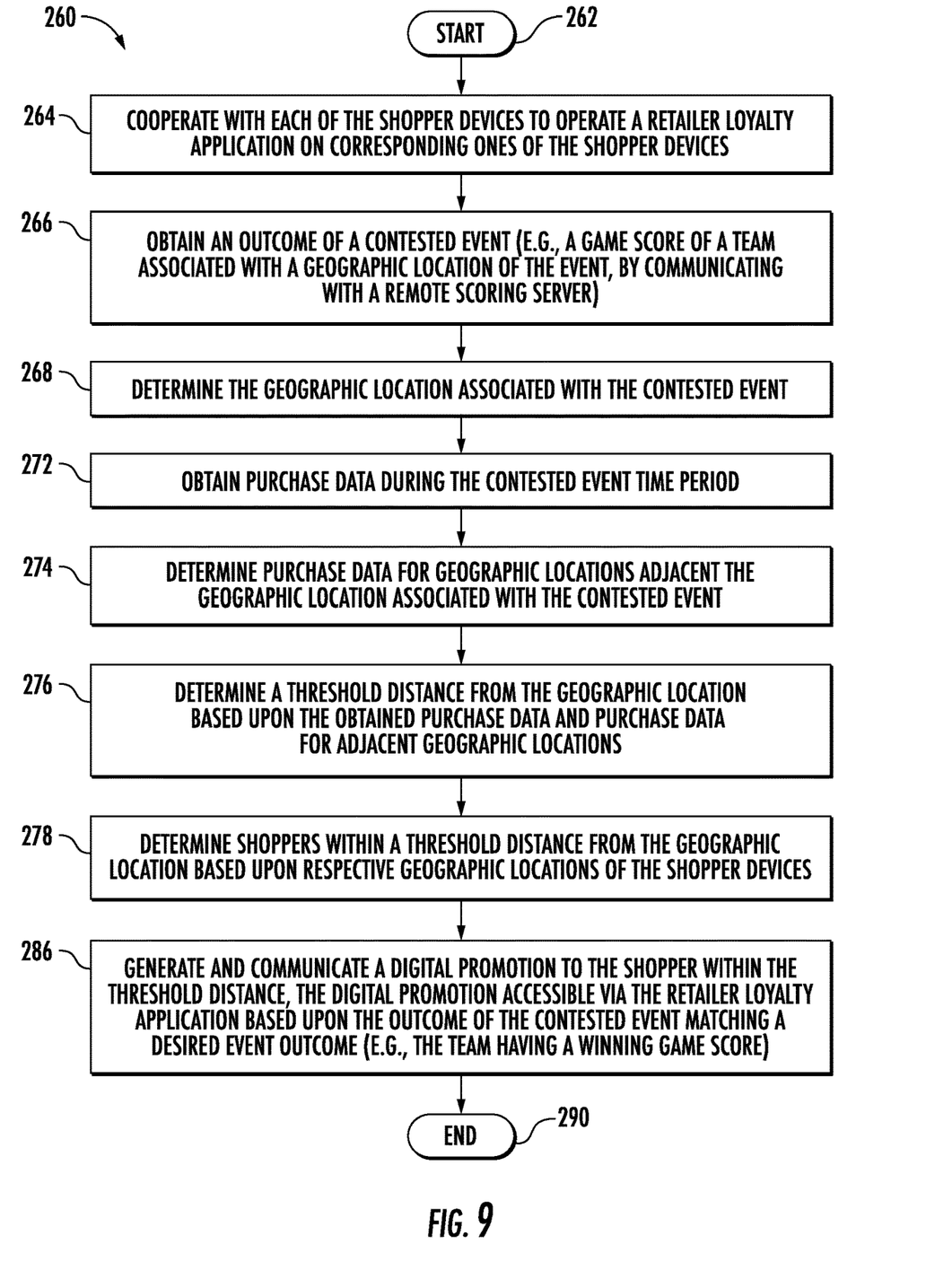
FIG. 9 is a flow diagram of operation of the digital promotion processing server of FIG. 8.

Referring now to FIG. 8 and the flowchart 260 in FIG. 9, beginning at Block 262, in another embodiment, the digital promotion processing sever 40" may obtain the purchase data (e.g., current purchase data) during a contested event time period 48" associated with the contested event 23", as described above (Block 272). At Block 274, the digital promotion processing server 40" may alternatively or additionally obtain the purchase data for geographic locations adjacent the geographic location associated with the contested event location 51". In some embodiments, the purchase data for the geographic locations adjacent the geographic location associated with the contested event 51" may not be obtained.

At Block 276, the digital promotion processing server 40" determines the threshold distance 28" from the geographic location 27" based upon the purchase data during the contested event time period 48" and purchase data for geographic locations adjacent the geographic location of the contested event 51". More particularly, during time periods where a contested event 23" draws larger amounts of people toward the geographic location 27" associated with the contested event 23", the digital promotion processing server 40" may determine the threshold distance 28" to be larger when the purchase data 48", 51" is indicative to more purchasing. For example, the digital promotion processing server 40" may use an increase in purchasing during the contested event time period to size the threshold distance 27" to encompass a larger number of people that would be considered "fans" or interested in the outcome 24" of the contested event 23" for purposes of obtaining a digital promotion 45".

Operations illustrated, including operating the retailer loyalty application 21" on corresponding ones of the shopper devices 30a" (Block 264), obtaining an outcome 24" of the contested event 23" (Block 266), determining the geographic location 27" associated with the contested event (Block 268), determining shoppers within the threshold distance 28" (Block 278) and generating and communicating the digital promotion 45" based upon the outcome of the contested event matching a desired event outcome 46" (Block 286), are similar to those described above. Elements illustrated, such as, geographic position data 22, are also similar to those described above. Operations end at Block 290.

A method of processing a digital promotion may include using a digital promotion processing server 40 to cooperate with each of a plurality of shopper devices 30a-30n, each associated with a given shopper, to operate a retailer loyalty application 21 on corresponding ones of the plurality of shopper devices. The method also includes using the digital promotion processing server 40 to obtain an outcome 24 of a contested event 23, determine a geographic location 27 associated with the contested event, and determine ones of the plurality of shoppers within a threshold distance 28 from the geographic location based upon respective geographic locations of the plurality of shopper devices 30a-30n. The method also includes using the digital promotion processing server 40 to generate and communicate a digital promotion 45 to the ones of the plurality of shoppers and accessible via the retailer loyalty application 21 based upon the outcome 24 of the contested event 23 matching a desired event outcome 46.

A non-transitory computer readable medium for processing a digital promotion includes computer executable instructions that when executed by a processor 41 cause the processor to perform operations. The operations include cooperating with each of a plurality of shopper devices 30a-30n, each associated with a given shopper, to operate a retailer loyalty application 21 on corresponding ones of the plurality of shopper devices, and obtaining an outcome 24 of a contested event 23. The operations also include determining a geographic location 27 associated with the contested event 23 and determining ones of the plurality of shoppers within a threshold distance 28 from the geographic location based upon respective geographic locations of the plurality of shopper devices 30a-30n. The operations also include generating and communicating a digital promotion 45 to the ones of the plurality of shoppers and accessible via the retailer loyalty application 21 based upon the outcome 24 of the contested event 23 matching a desired event outcome 46.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
   a plurality of shopper devices, each associated with a given shopper and comprising a global position system (GPS) receiver configured to obtain a respective geographic position including geographic position coordinates; and
   a digital promotion processing server configured to
      cooperate with each of the plurality of shopper devices to operate a retailer loyalty application on corresponding ones of the plurality of shopper devices, the retailer loyalty application being associated with a given retailer,
      obtain a contested event outcome of a contested event having event identifiers associated therewith and having a contested event time period associated therewith,
      determine a geographic location associated with the contested event by communicating the event identifiers associated with the contested event to a remote server and obtaining from the remote server, the geographic location associated with the contested event,
      determine a first desired event outcome for the contested event based upon the geographic location associated with the contested event,
      obtain historical purchase data associated with the plurality of shopper devices based upon accessing an associated shopper loyalty account via the retailer loyalty application,
      obtain respective geographic positions of each of the plurality of shopper devices including the geographic position coordinates,
      determine ones of the plurality of shoppers having a geographic position within a threshold distance from the geographic location of the contested event by determining, by comparison, that geographic position coordinates associated with the plurality of shopper devices correspond to being within geographic position coordinates associated with the threshold distance, and
      determining, based upon the shopper loyalty account and the geographic position coordinates associated with the threshold distance, shoppers that have a home address outside the threshold distance and visit the given retailer within the threshold distance more than a threshold number of times in a given time period based upon the historical purchase data, the threshold number of times being determined based upon a distance between the given retailer and the home address,
      determine other ones of the plurality of shoppers having a geographic position within the threshold distance from the geographic location of the contested event during the contested event by determining, by comparison, that geographic position coordinates associated with the other plurality of shopper devices correspond to being within the geographic position coordinates associated with the threshold distance during the contested event,
      change the first desired contested event outcome to a second desired contested event outcome based upon a number of other ones of the plurality of shoppers being greater than a number of the ones of the plurality of shoppers,
      generate and communicate a digital promotion to the ones of the plurality of shoppers and accessible via the retailer loyalty application based upon the outcome of the contested event matching the first desired contested event outcome, and
      generate and communicate the digital promotion to the other ones of the plurality of shoppers based upon the outcome of the contested event matching the second desired contested event outcome.

2. The digital promotion processing system of claim 1 wherein the contested event outcome comprises a game score of a team associated with the geographic location of the contested event; and wherein the first desired contested event outcome is the team having a winning game score.

3. The digital promotion processing system of claim 1 wherein the digital promotion processing server is configured to determine at least one of the first and second desired contested event outcomes based upon the historical purchase data.

4. The digital promotion processing system of claim 1 wherein the digital promotion processing server is configured to obtain purchase data during the contested event time period and determine at least one of the first and second desired contested event outcomes based upon the purchase data during the contested event time period.

5. The digital promotion processing system of claim 1 wherein the digital promotion processing server is configured to obtain purchase data during the contested event time period and determine the threshold distance based upon the purchase data during the contested event time period.

6. The digital promotion processing system of claim 1 wherein the digital promotion processing server is configured to determine purchase data for geographic locations adjacent the geographic location associated with the contested event and determine the threshold distance based upon the purchase data for the adjacent geographic locations.

7. The digital promotion processing system of claim 1 wherein the digital promotion processing server is configured to make an application programming interface (API)

function call to the remote server with the event identifiers to obtain the contested event outcome.

8. The digital promotion processing system of claim 1 wherein the digital promotion processing server is configured to cooperate with a given shopper device of the plurality thereof to, via the retailer loyalty application, save the digital promotion to a digital wallet associated with the corresponding shopper.

9. A digital promotion processing server comprising:
a processor and an associated memory configured to
  cooperate with each of a plurality of shopper devices, each associated with a given shopper, to operate a retailer loyalty application on corresponding ones of the plurality of shopper devices, the retailer loyalty application being associated with a given retailer, and each of the plurality of shopper devices comprising a global position system (GPS) receiver configured to obtain a respective geographic position including geographic position coordinates,
  obtain an outcome of a contested event having event identifiers associated therewith and having a contested event time period associated therewith,
  determine a geographic location associated with the contested event by communicating the event identifiers associated with the contested event to a remote server and obtaining from the remote server, the geographic location associated with the contested event,
  determine a first desired contested event outcome for the contested event based upon the geographic location associated with the contested event,
  obtain historical purchase data associated with the plurality of shopper devices based upon accessing an associated shopper loyalty account via the retailer loyalty application,
  obtain respective geographic positions of each of the plurality of shopper devices including the geographic position coordinates,
  determine ones of the plurality of shoppers having a geographic position within a threshold distance from the geographic location of the contested event by
    determining, by comparison, that geographic position coordinates associated with the plurality of shopper devices correspond to being within geographic position coordinates associated with the threshold distance, and
    determining, based upon the shopper loyalty account and the geographic position coordinates associated with the threshold distance, shoppers that have a home address outside the threshold distance and visit the given retailer within the threshold distance more than a threshold number of times in a given time period based upon the historical purchase data, the threshold number of times being determined based upon a distance between the given retailer and the home address,
  determine other ones of the plurality of shoppers having a geographic position within the threshold distance from the geographic location of the contested event during the contested event by determining, by comparison, that geographic position coordinates associated with the other plurality of shopper devices correspond to being within the geographic position coordinates associated with the threshold distance during the contested event,
  change the first desired contested event outcome to a second desired contested event outcome based upon a number of other ones of the plurality of shoppers being greater than a number of the ones of the plurality of shoppers,
  generate and communicate a digital promotion to the ones of the plurality of shoppers and accessible via the retailer loyalty application based upon the outcome of the contested event matching the first desired contested event outcome, and
  generate and communicate the digital promotion to the other ones of the plurality of shoppers based upon the outcome of the contested event matching the second desired contested event outcome.

10. The digital promotion processing server of claim 9 wherein the contested event outcome comprises a game score of a team associated with the geographic location of the contested event; and wherein the first desired contested event outcome is the team having a winning game score.

11. The digital promotion processing server of claim 9 wherein the processor is configured to determine at least one of the first and second desired event outcomes based upon the historical purchase data.

12. The digital promotion processing server of claim 9 wherein the processor is configured to obtain purchase data during the contested event time period and determine at least one of the first and second desired event outcomes based upon the purchase data during the contested event time period.

13. The digital promotion processing server of claim 9 wherein the processor is configured to obtain purchase data during the contested event time period and determine the threshold distance based upon the purchase data during the contested event time period.

14. The digital promotion processing server of claim 9 wherein the processor is configured to determine purchase data for geographic locations adjacent the geographic location associated with the contested event and determine the threshold distance based upon the purchase data for the adjacent geographic locations.

15. A method of processing a digital promotion comprising:
using a digital promotion processing server to
  cooperate with each of a plurality of shopper devices, each associated with a given shopper, to operate a retailer loyalty application on corresponding ones of the plurality of shopper devices, the retailer loyalty application being associated with a given retailer, and each of the plurality of shopper devices comprising a global position system (GPS) receiver configured to obtain a respective geographic position including geographic position coordinates,
  obtain an outcome of a contested event having event identifiers associated therewith and having a contested event time period associated therewith,
  determine a geographic location associated with the contested event by communicating the event identifiers associated with the contested event to a remote server and obtaining from the remote server, the geographic location associated with the contested event,
  determine a first desired contested event outcome for the contested event based upon the geographic location associated with the contested event,
  obtain historical purchase data associated with the plurality of shopper devices based upon accessing an associated shopper loyalty account via the retailer loyalty application, obtain respective geographic positions of each of the plurality of shopper devices including the geographic position coordinates, determine ones of the plurality of shoppers having a geographic position within a threshold distance from the geographic location of the contested event by
determining, by comparison, that geographic position coordinates associated with the plurality of shopper devices correspond to being within geographic position coordinates associated with the threshold distance, and
determining, based upon the shopper loyalty account and the geographic position coordinates associated with the threshold distance, shoppers that have a home address outside the threshold distance and visit the given retailer within the threshold distance more than a threshold number of times in a given time period based upon the historical purchase data, the threshold number of times being determined based upon a distance between the given retailer and the home address, determine other ones of the plurality of shoppers having a geographic position within the threshold distance from the geographic location of the contested event during the contested event by determining, by comparison, that geographic position coordinates associated with the other plurality of shopper devices correspond to being within the geographic position coordinates associated with the threshold distance during the contested event, change the first desired contested event outcome to a second desired contested event outcome based upon a number of other ones of the plurality of shoppers being greater than a number of the ones of the plurality of shoppers, generate and communicate a digital promotion to the ones of the plurality of shoppers and accessible via the retailer loyalty application based upon the outcome of the contested event matching the first desired contested event outcome, and generate and communicate the digital promotion to the other ones of the plurality of shoppers based upon the outcome of the contested event matching the second desired contested event outcome.

16. The method of claim 15 wherein the contested event outcome comprises a game score of a team associated with the geographic location of the contested event; and wherein the first desired contested event outcome is the team having a winning game score.

17. The method of claim 15 wherein using the digital promotion processing server comprises using the digital promotion processing server to determine at least one of the first and second desired event outcomes based upon the historical purchase data.

18. The method of claim 15 wherein using the digital promotion processing server comprises using the digital promotion processing server to obtain purchase data during the contested event time period and determine at least one of the first and second desired event outcomes based upon the purchase data during the event time period.

19. A non-transitory computer readable medium for processing a digital promotion, the non-transitory computer readable medium comprising computer executable instructions that when executed by a processor cause the processor to perform operations comprising:

cooperating with each of a plurality of shopper devices, each associated with a given shopper, to operate a retailer loyalty application on corresponding ones of the plurality of shopper devices, the retailer loyalty application being associated with a given retailer, and each of the plurality of shopper devices comprising a global position system (GPS) receiver configured to obtain a respective geographic position including geographic position coordinates;

obtaining an outcome of a contested event having event identifiers associated therewith, and having a contested event time period associated therewith;

determining a geographic location associated with the contested event by communicating the event identifiers associated with the contested event to a remote server and obtaining from the remote server, the geographic location associated with the contested event;

determining a first desired contested event outcome for the contested event based upon the geographic location associated with the contested event;

obtaining historical purchase data associated with the plurality of shopper devices based upon accessing an associated shopper loyalty account via the retailer loyalty application, obtaining respective geographic positions of each of the plurality of shopper devices including the geographic position coordinates;

determining ones of the plurality of shoppers having a geographic position within a threshold distance from the geographic location of the contested event by
determining, by comparison, that geographic position coordinates associated with the plurality of shopper devices correspond to being within geographic position coordinates associated with the threshold distance, and
determining, based upon the shopper loyalty account and the geographic position coordinates associated with the threshold distance, shoppers that have a home address outside the threshold distance and visit the given retailer within the threshold distance more than a threshold number of times in a given time period based upon the historical purchase data, the threshold number of times being determined based upon a distance between the given retailer and the home address;

determining other ones of the plurality of shoppers having a geographic position within the threshold distance from the geographic location of the contested event during the contested event by determining, by comparison, that geographic position coordinates associated with the other plurality of shopper devices correspond to being within the geographic position coordinates associated with the threshold distance during the contested event;

changing the first desired contested event outcome to a second desired contested event outcome based upon a number of other ones of the plurality of shoppers being greater than a number of the ones of the plurality of shoppers;

generating and communicating a digital promotion to the ones of the plurality of shoppers and accessible via the retailer loyalty application based upon the outcome of the contested event matching the first desired contested event outcome; and generating and communicating the digital promotion to the other ones of the plurality of shoppers based upon the outcome of the contested event matching the second desired contested event outcome.

20. The non-transitory computer readable medium of claim 19 wherein the operations comprise determining at least one of the first and second desired event outcomes based upon the historical purchase data.

21. The non-transitory computer readable medium of claim 19 wherein the operations comprise obtaining purchase data during the contested event time period and determining at least one of the first and second desired event outcomes based upon the purchase data during the contested event time period.

\* \* \* \* \*